(12) United States Patent
Moore

(10) Patent No.: US 7,900,982 B2
(45) Date of Patent: Mar. 8, 2011

(54) BUMPER PANEL ASSEMBLY

(75) Inventor: Jaime Nicole Moore, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 143 days.

(21) Appl. No.: 12/355,162

(22) Filed: Jan. 16, 2009

(65) Prior Publication Data

US 2010/0181785 A1   Jul. 22, 2010

(51) Int. Cl.
*B60R 19/03* (2006.01)
(52) U.S. Cl. .......................................... 293/120
(58) Field of Classification Search .................. 293/120, 293/102, 117, 121, 155; 428/31; 280/762, 280/770; 296/187.09, 29, 187.11, 193.09
See application file for complete search history.

(56) References Cited

U.S. PATENT DOCUMENTS

| | | | |
|---|---|---|---|
| 4,350,378 A * | 9/1982 | Wakamatsu | 293/120 |
| 4,457,547 A * | 7/1984 | Sekiyama et al. | 293/110 |
| D292,788 S | 11/1987 | Koch | |
| 4,830,416 A * | 5/1989 | Matsuoka | 293/120 |
| 4,978,164 A * | 12/1990 | Nakamura et al. | 296/193.04 |
| 5,139,304 A * | 8/1992 | Tajiri | 293/117 |
| 5,201,912 A * | 4/1993 | Terada et al. | 293/120 |
| 5,561,882 A * | 10/1996 | Eustache et al. | 15/250.001 |
| 5,688,006 A | 11/1997 | Bladow et al. | |
| 5,709,407 A * | 1/1998 | Stephens et al. | 280/751 |
| 5,814,357 A | 9/1998 | Boskovic | |
| 6,644,700 B2 | 11/2003 | Ito et al. | |
| 6,824,199 B2 * | 11/2004 | Weik et al. | 296/187.04 |
| 6,964,441 B2 | 11/2005 | Ariga et al. | |
| D543,137 S | 5/2007 | Levy | |
| 7,455,351 B2 * | 11/2008 | Nakayama et al. | 296/193.1 |
| 2001/0046140 A1 * | 11/2001 | Chase et al. | 362/549 |

* cited by examiner

*Primary Examiner* — Kiran B. Patel
(74) *Attorney, Agent, or Firm* — Gifford, Krass, Sprinkle, Anderson & Citkowski, P.C.

(57) ABSTRACT

A bumper panel assembly for use in a vehicle including an upper bumper panel and a lower bumper panel attached to the upper bumper panel. The bumper panel assembly is formed without cut outs and walls so as to eliminate the need of using lifters to form the bumper panel assembly, and thus reducing manufacturing costs. The upper bumper panel includes a groove extending along the width of the panel, and the lower bumper has a first edge seated along the groove so as to define a styling line. The lower panel further includes a second edge spaced apart from the first edge. A seal is disposed on the second edge and interconnects the lower bumper panel to the vehicle body when the vehicle bumper is assembled onto the vehicle so as to enhance the aerodynamic characteristics of the bumper panel assembly.

10 Claims, 4 Drawing Sheets

BUMPER PANEL ASSEMBLY

FIELD OF THE INVENTION

The present invention relates to a bumper panel assembly for use in an automotive vehicle. Specifically, the present invention relates to a bumper panel assembly with an aesthetically pleasing styling line.

BACKGROUND OF THE INVENTION

Bumpers are well known and documented. Bumpers provide vehicles with protection from collisions, and are designed to make the vehicle more aesthetically pleasing. Bumpers are often molded using a plastic injection mold and cover the rear or front end of a vehicle. It may be desirable to provide bumpers with a surface for which to seal the bumper to the vehicle. Accordingly, bumpers may be manufactured with undercuts, or walls extending from a free edge of the bumper so as to provide a surface for sealing the bumper to the vehicle body. Sealing the bumper to a portion of the vehicle body is desirable because the seal helps improve the vehicle's aerodynamics.

The need of an undercut or wall requires that the mold use what is referred to in the art as a lifter. The lifter is a device in the mold that allows the mold to disengage from the formed part without destroying the wall or undercut. For instance, U.S. Pat. No. 5,814,357 to Boskovic discloses a core lifter system for a plastic injection mold with a core blade that is used not only to provide the undercut, but also to aid in the injection of the formed mold part. However systems such as core lifters increase the cost of injection molding apparatus which consequently increases the manufacturing costs. Accordingly, it is desirable to have a bumper that does not require the use of a cut-out or wall in order to seal the bumper to the vehicle body so as to save on manufacturing costs. At the same time, it is desirable to have a bumper panel assembly that may be sealed to the vehicle body so as to improve the aerodynamics of the vehicle.

As stated, bumpers not only provide protection to the passengers, but also add to the vehicle's aesthetic beauty. Current vehicle trends involve the use of a styling line to add to the aesthetic beauty of a vehicle. A styling line is a term used in the art to define a visible line on the surface of a vehicle body. In some instances, the styling line may be defined by the space between two adjoining panels of the vehicle body, and in other cases the styling line is etched onto the surface of the vehicle body. Thus it is desirable to have a vehicle bumper with a styling line so as to add to the aesthetic quality of the vehicle.

SUMMARY OF THE INVENTION AND ADVANTAGES

A bumper panel assembly for use in a vehicle including an upper bumper panel and a lower bumper panel attached to the upper bumper panel. The upper bumper panel includes a groove extending along the width of the panel, and the lower bumper has a first edge seated along the groove so as to define a styling line. The lower panel further includes a second edge spaced apart from the first edge. The second edge may include a flange with a seal disposed thereon, the seal interconnects the lower bumper panel to the vehicle body when the vehicle bumper is assembled onto the vehicle.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
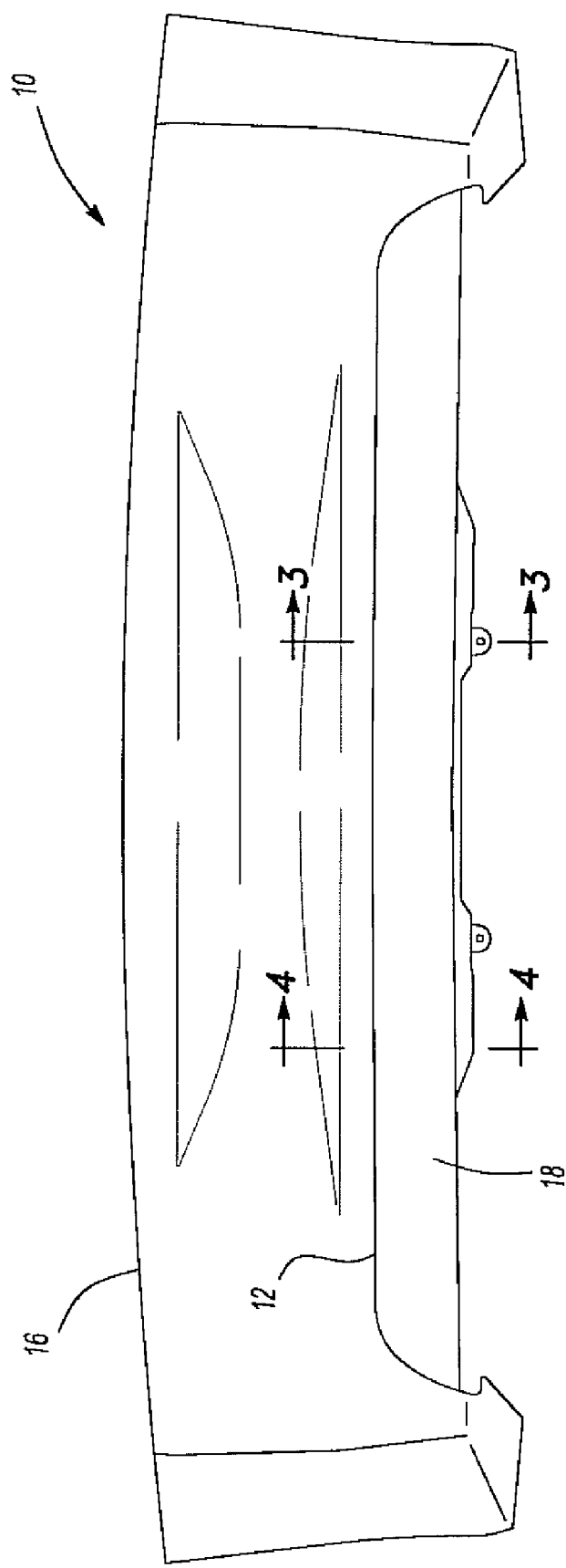
FIG. 1 is view of the bumper panel assembly taken from behind the vehicle.
Figure 2:
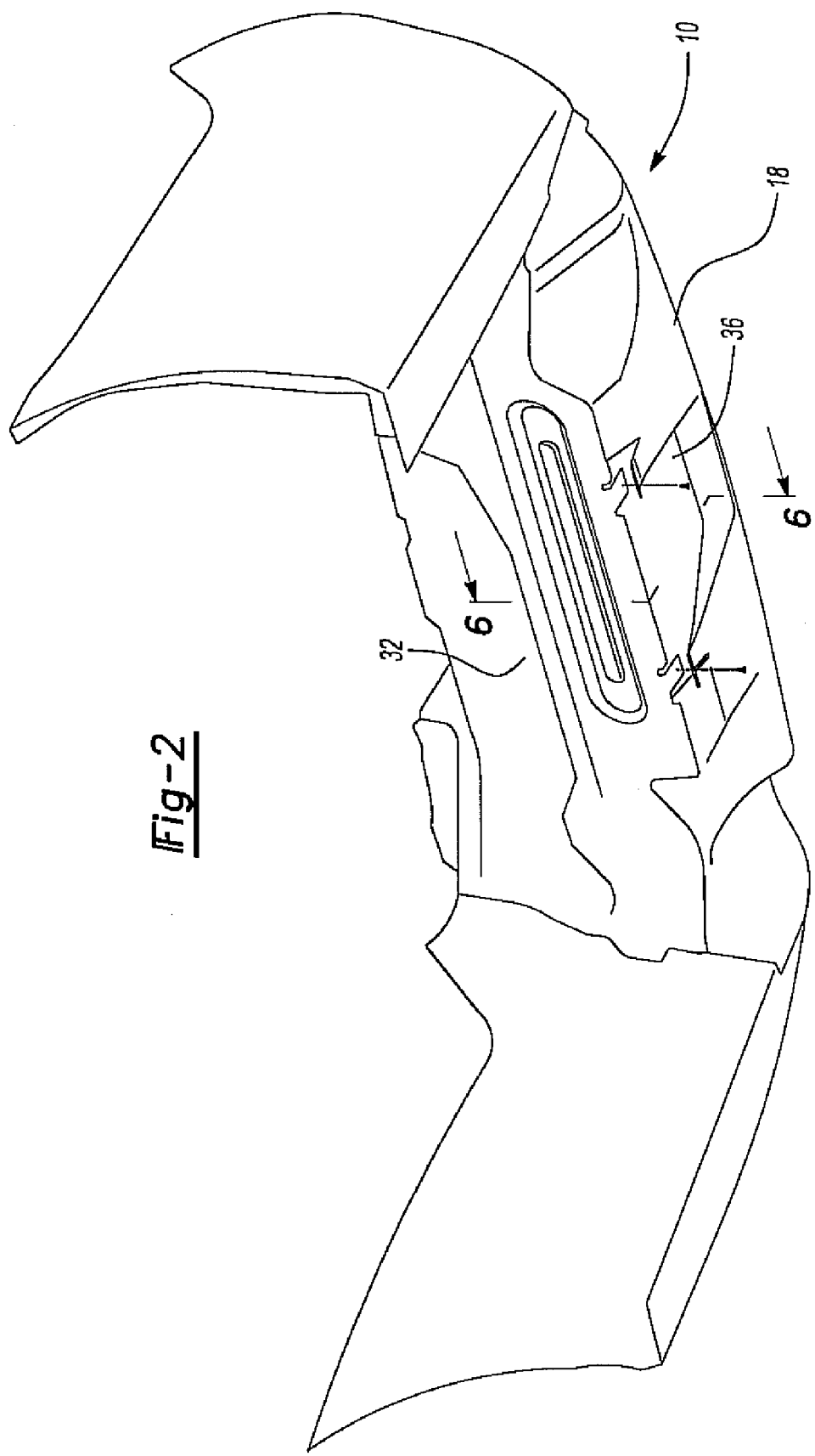
FIG. 2 is a perspective view of the bumper panel assembly showing the bumper panel assembly attached to the vehicle body.
Figure 3:
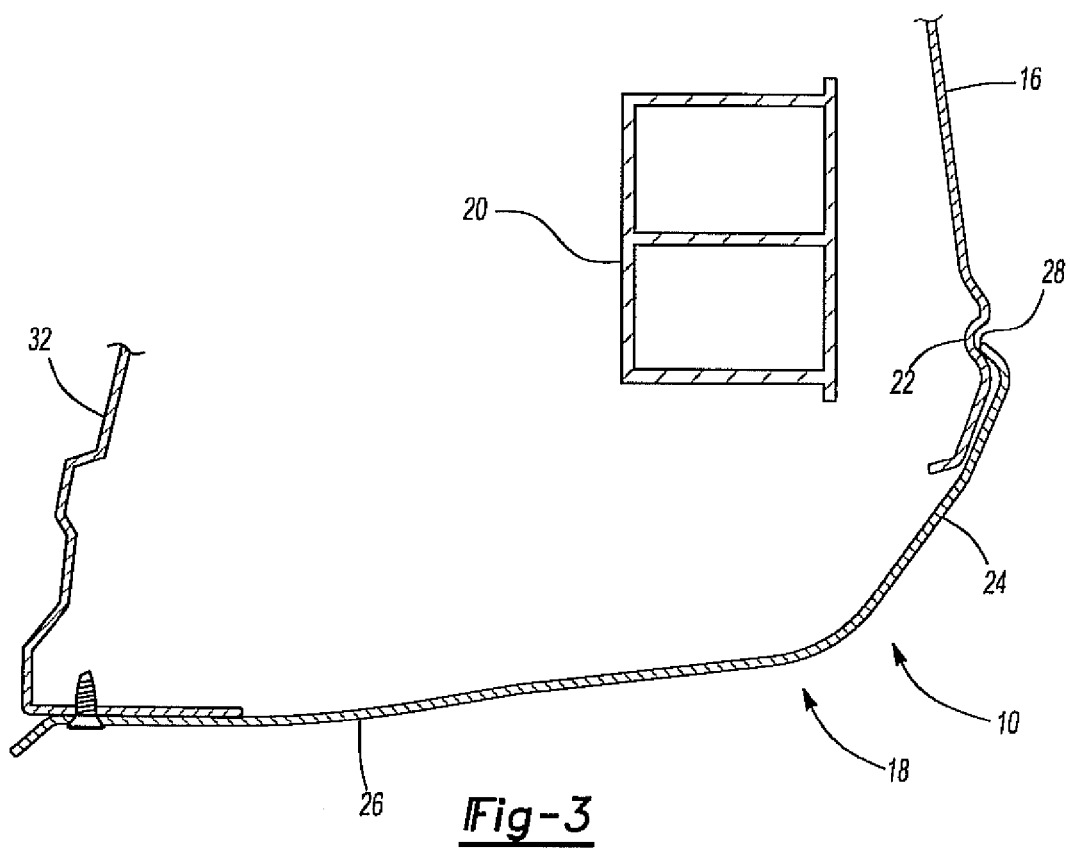
FIG. 3 is a cross-sectional view of the bumper panel assembly of FIG. 1 taken along lines 3-3, as shown, the bumper panel assembly may be further secured to the vehicle using a fastening means such as a screw.
Figure 4:
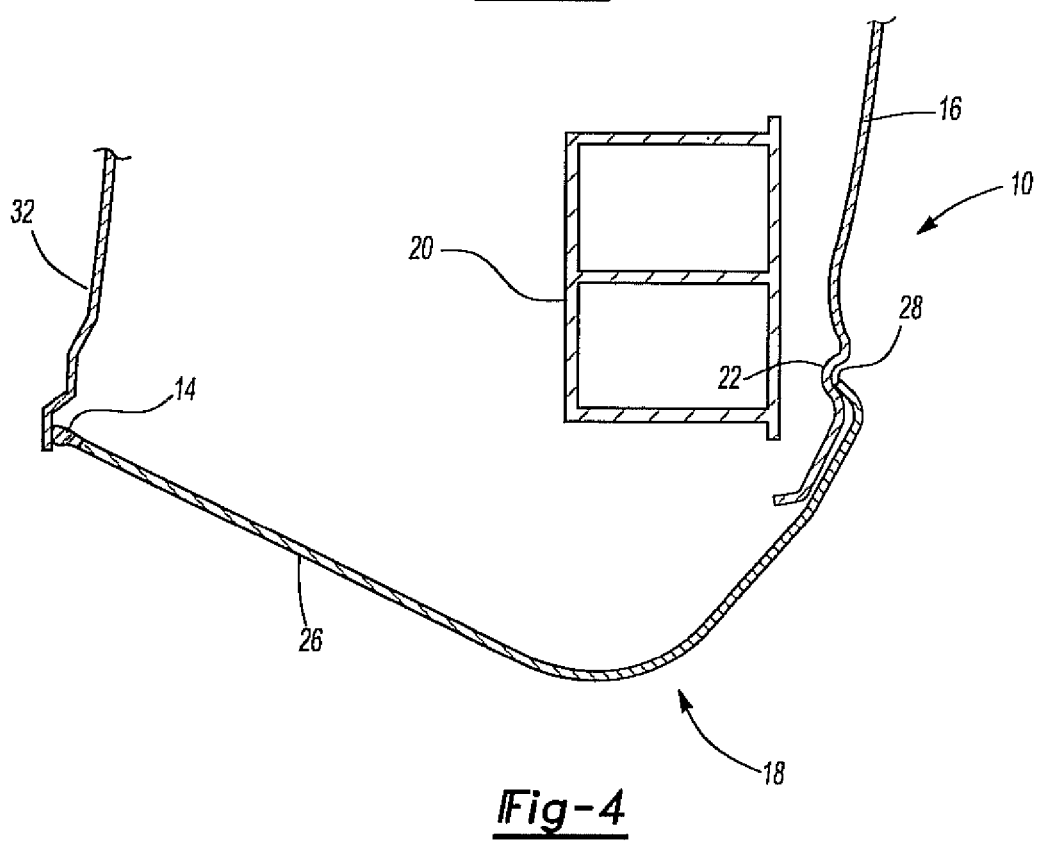
FIG. 4 is a cross-sectional view of the bumper panel assembly of FIG. 1 taken along lines 4-4, as shown, the seal is pressed between the edge of the lower bumper panel and the vehicle body.

Referring to the Figures, wherein like numerals indicate corresponding parts throughout the several views, a bumper panel assembly 10 having a styling line 12 and a seal 14 is provided. The bumper panel assembly 10 generally extends across the width of the vehicle and includes an upper bumper panel 16 attached to a lower bumper panel 18. The bumper panel assembly 10 may be disposed on either end of the vehicle, but is shown configured to attach to the rear of the vehicle for illustrative purposes only. As stated above, the bumper panel assembly 10 not only provides protection, but also serves to add to the aesthetic beauty of the vehicle. Accordingly, the bumper panel assembly 10 often covers a bumper reinforcement 20 as shown in FIGS. 3 and 4. The upper bumper panel 16 includes a groove 22 extending along the width of the upper bumper panel 16, meaning that the groove 22 extends along the upper bumper panel 16 generally between the left and right tail lights of the vehicle. The upper and lower bumper panel 16, 18 may be formed out of steel, fiberglass, or a thermoplastic polymer.

The lower bumper panel 18 includes a first panel portion 24 integrally connected to a second panel portion 26. The second panel portion has a generally planar surface. Upon installation of the bumper panel assembly 10 onto the vehicle, the second portion of the lower bumper extends underneath a portion of the vehicle. The lower bumper panel 18 further includes a first edge 28 opposite and spaced apart from a second edge 30, such that the first edge 28 is disposed on the first panel portion 24 and the second edge 30 is disposed on the second panel portion 26. The first edge 28 of the lower bumper panel 18 is seated within the groove 22 of the upper bumper panel 16 so as to define a styling line 12. The lower bumper panel 18 is configured such that the second edge 30 is spaced apart and opposite the vehicle body 32 a first predetermined distance when the bumper panel assembly 10 is installed onto the vehicle.

A seal 14 is disposed on the second edge 30, and has a width greater than the first predetermined distance. The seal 14 extends from the second edge 30 and interconnects the lower bumper panel 18 to the vehicle body 32. Specifically, as the bumper panel assembly 10 is installed onto the vehicle, the seal 14 is pressed into engagement with the vehicle body 32, as shown in FIG. 4. However, it is anticipated that the bumper panel assembly 10 may be sealed to the front of the vehicle body 32, as well as along the underside of the vehicle body 32. The seal 14 is thus compressed between the second edge 30 and the vehicle body 32 so as to fill any gap 36 therebetween. Thus, it is inherent that the seal 14 is configured so as to be squeezed between the second edge 30 of the lower bumper panel 18 and the vehicle body 32.

The seal 14 may be integrally formed to the second edge 30 using a process such as injection molding, or may be fixed onto the second edge 30 after the lower panel has been manufactured. Alternatively, the seal may be fixed onto the vehicle body 32. The seal 14 may be formed of a polymer, foam or sponge and may be configured so as to define a bulb, lip, vertical wedge, or sweep seal 14.

Figure 5:
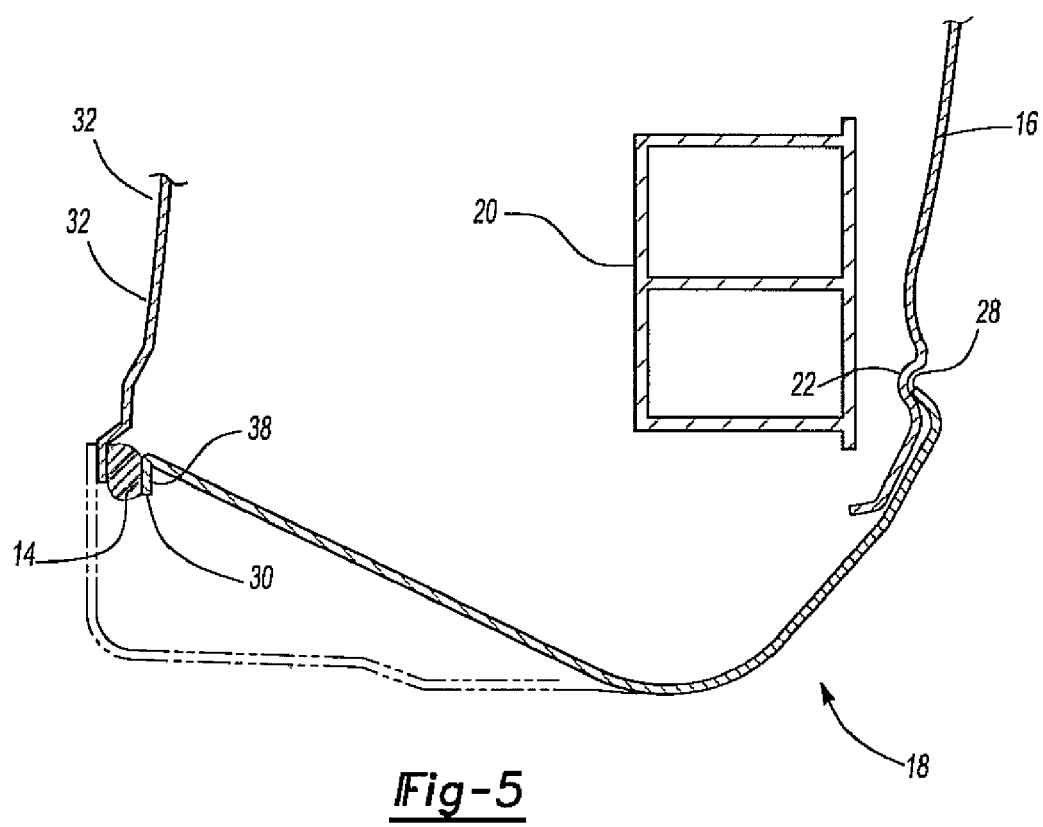
FIG. 5 is a cross-sectional view of the bumper panel assembly of FIG. 4 including a flange.

With reference to FIG. 5, the second edge 30 may further include a flange 38. The flange 38 is shown generally orthogonal to the second edge 30; however it is anticipated that the flange 38 is inclined so as to provide an optional surface for sealing the bumper to the vehicle body. Specifically, the flange 38 provides a surface for which the seal 14 may be attached to. It is understood that the seal 14 may be integrally formed onto the flange 38 or may be fixed thereon subsequent to the manufacture of the lower bumper panel 18. The bumper panel assembly 10 may be further secured to the vehicle body 32 by using vibrational welding techniques, heat-staking, screws, screws and grommets, nuts and bolts, clips, features integrated into the bumper, or the like as shown in FIG. 3.

Figure 6:
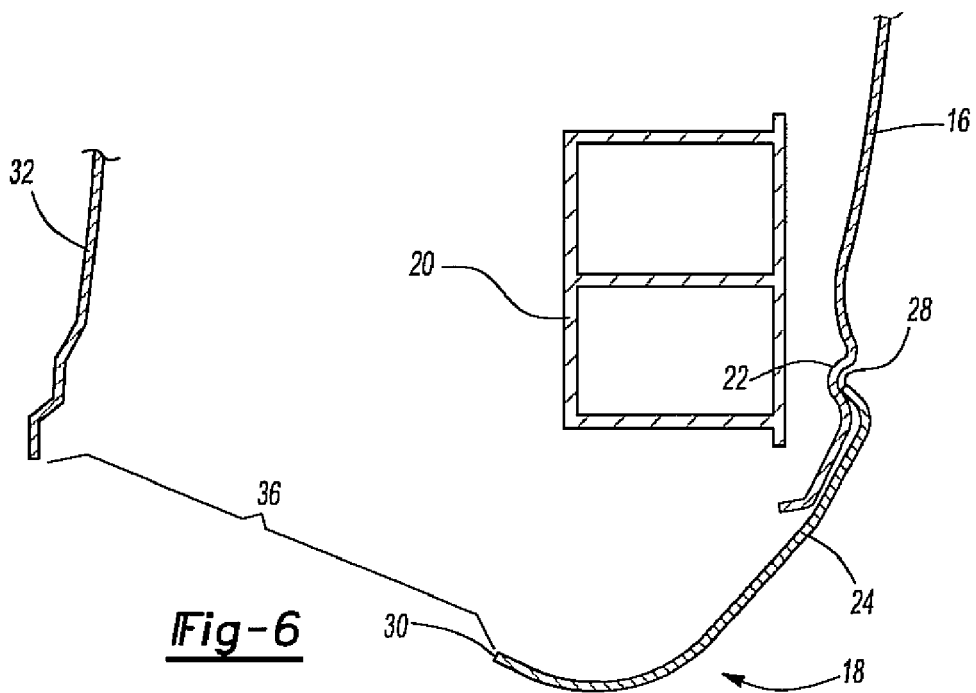
FIG. 6 is a cross-sectional view of the bumper panel assembly of FIG. 2 taken along lines 6-6, as shown a portion of the lower bumper is spaced apart from the vehicle body.

With reference now to FIG. 6, a portion of second edge 30 of the lower bumper panel 18 is spaced apart from the vehicle body 32 a second predetermined distance so as to define a gap 36 in the lower bumper panel 18 and change the aerodynamic characteristics of the bumper panel assembly 10. Specifically, a portion of the second edge 30 is further from the vehicle body 32 than the first predetermined distance so as to define a gap 36 between a portion of the second panel portion 26 and the vehicle body 32 when the bumper panel assembly 10 is installed on the vehicle.

Obviously, many modifications and variations of the present invention are possible in light of the above teachings and may be practiced otherwise than as specifically described while within the scope of the appended claims. In addition, the reference numerals in the specification are merely for convenience and are not to be read in any way as limiting.

What is claimed is:

1. A bumper panel assembly for use in a vehicle, the bumper panel assembly comprising:

a lower bumper panel having a first edge opposite and spaced apart from a second edge, the second edge is spaced apart and opposite the vehicle body a first predetermined distance;

an upper bumper panel having a groove extending along the width of the upper bumper panel, the first edge of the lower bumper panel seated within the groove of the upper bumper panel, and extending along the groove so as to define a styling line; and a seal disposed on the second edge of the lower bumper panel, the seal interconnecting the lower bumper panel to the vehicle body.

2. The bumper panel assembly as set forth in claim 1 wherein the second edge includes a flange, and the seal is disposed on the flange.

3. The bumper panel assembly as set forth in claim 1 wherein the lower bumper panel and the upper bumper panel extend along the width of the vehicle.

4. The bumper panel assembly as set forth in claim 3 wherein the lower panel further includes a first panel portion integrally connected to a second panel portion, and wherein the second portion extends underneath a portion of the vehicle.

5. The bumper panel assembly as set forth in claim 4 wherein the first edge is disposed on the first panel portion, and the second edge is disposed on the second panel portion.

6. The bumper panel assembly as set forth in claim 1 wherein the seal is integrally formed to the second edge.

7. The bumper panel assembly as set forth in claim 6 wherein the seal is one selected from a group consisting of bulb, lip, vertical wedge, sponge seal, and sweep.

8. The bumper panel assembly as set forth in claim 3 wherein a portion of the second edge is spaced apart from the vehicle body a second predetermined distance, wherein the second predetermined distance is greater than the first predetermined distance so as to define a gap between a portion of the lower bumper panel and the vehicle body.

9. The bumper panel assembly as set forth in claim 1 wherein the upper and lower bumper panel are formed from one selected from a group consisting of steel, fiberglass, and thermoplastic polymer.

10. The bumper panel assembly as set forth in claim 4 wherein the second panel portion has a generally planar surface.

* * * * *